(12) United States Patent
Kubo

(10) Patent No.: US 8,294,391 B2
(45) Date of Patent: Oct. 23, 2012

(54) MOVING BODY SYSTEM AND METHOD OF DETERMINING INITIAL POSITION OF MOVING BODY

(75) Inventor: Hideki Kubo, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 343 days.

(21) Appl. No.: 12/829,512

(22) Filed: Jul. 2, 2010

(65) Prior Publication Data

US 2011/0050007 A1    Mar. 3, 2011

(30) Foreign Application Priority Data

Aug. 28, 2009  (JP) ................................. 2009-197684

(51) Int. Cl.
  *H02P 6/20* (2006.01)
  *H02K 41/02* (2006.01)
(52) U.S. Cl. ...................... 318/135; 310/12.19; 318/687
(58) Field of Classification Search ................ 310/12.19
  See application file for complete search history.

(56) References Cited

U.S. PATENT DOCUMENTS

| | | | | |
|---|---|---|---|---|
| 4,238,715 A | * | 12/1980 | Parsch et al. | 318/135 |
| 4,658,214 A | * | 4/1987 | Petersen | 324/207.24 |
| 6,037,739 A | * | 3/2000 | Hartramph et al. | 318/687 |
| 6,720,680 B1 | * | 4/2004 | Tanaka | 310/12.19 |
| 2005/0156473 A1 | * | 7/2005 | Tosiya | 310/120 |

FOREIGN PATENT DOCUMENTS

| | | |
|---|---|---|
| JP | 8-33388 A | 2/1996 |
| JP | 10-056792 | 2/1998 |
| JP | 2000-224833 A | 8/2000 |
| JP | 2007-082307 A | 3/2007 |
| WO | 00/46911 A1 | 8/2000 |

OTHER PUBLICATIONS

Official Communication issued in corresponding Japanese Patent Application No. 2009-197684, mailed on Jun. 28, 2011.

* cited by examiner

*Primary Examiner* — Burton Mullins
(74) *Attorney, Agent, or Firm* — Keating & Bennett, LLP

(57) ABSTRACT

In a moving body system, a movable element of a linear motor is provided on a moving body, and stationary elements of the linear motor and position sensors are provided on the ground. The stationary elements are arranged between the position sensors to enable determination of a rough position of the movable element based on a change of inductance resulting from interaction with a magnet array. An initial position of the moving body when a power supply for the moving body system is turned on is determined based on the rough position of the movable element relative to the stationary element and a signal from the position sensor.

6 Claims, 4 Drawing Sheets

MOVING BODY SYSTEM AND METHOD OF DETERMINING INITIAL POSITION OF MOVING BODY

BACKGROUND OF THE INVENTION

1. Field of the Invention

The present invention relates a moving body system including a linear motor having a primary side on the ground and a secondary side on a moving body. In particular, the present invention relates to a technique of measuring an initial position of the moving body, e.g., at the time of a start-up operation of the system.

2. Description of the Related Art

JP2007-82307A discloses a technique of controlling a linear motor by providing a movable element of the linear motor on a moving body such as a stacker crane, providing stationary elements of the linear motor on the ground, and detecting a position of the moving body using linear sensors. The stationary elements are provided discretely, and the linear sensors are provided discretely to determine the position of the moving body based on a signal from a linear sensor detecting the moving body.

In this regard, in general, the movable element is made up of a plurality of magnets, and the linear sensor determines the position of a detected magnet among the plurality of magnets by counting the number of magnets. For determining the position of the movable element without counting the number of magnets, a linear sensor having a measurement range longer than the length of the movable element is required. Such a linear sensor is disadvantageous in terms of the cost. For example, at the time of performing a starting operation of a system for the first time, or at the time of performing a restoring operation after a power failure, it is necessary to carry out the start-up operation of the system from a state where the initial position of the moving body is unknown. In the case of using a position sensor having a measurement range that is shorter than the length of the movable element, at the time of the start-up operation, the position of the movable element cannot be determined unambiguously. Under the circumstances, there is a demand to unambiguously determine the position of the movable element at the time of start-up operation, even in the case of using a position sensor having a measurement range that is shorter than the length of the movable element.

SUMMARY OF THE INVENTION

Preferred embodiments of the present invention provide a system, technique and method of unambiguously determining an absolute position of a movable element using a position sensor having a measurement range that is shorter than a magnet array of the movable element so as to determine a position of the movable element more reliably.

According to a preferred embodiment of the present invention, a moving body system includes a moving body including a magnet array as a movable element of a linear motor, stationary elements of the linear motor provided on a ground, and position sensors each having a measurement range that is shorter than a length of the movable element. Each of the stationary elements includes a plurality of coils.

The position sensors are arranged discretely, and the stationary elements are arranged between the position sensors to enable determination of a rough position of the movable element based on a change of inductance of a coil of any of the stationary elements resulting from interaction with the magnet array.

The moving body system further includes a start-up unit arranged to determine an initial position of the moving body when a power supply for the moving body system is turned on, based on the rough position of the movable element relative to the stationary element and a signal from the position sensor.

When the magnet array of the movable element faces the coils of the stationary element, the inductance of the coil changes. For example, the inductance of the coil facing the movable element is different from the inductance of the coil that does not face the movable element. Therefore, in a preferred embodiment of the present invention, a rough position of the movable element is determined based on a change of inductance of the coil of the stationary element resulting from interaction with the magnet array. Then, a fine position is determined by the position sensor. Therefore, an absolute position of the movable element can be determined unambiguously even if the position sensor has a measurement range that is shorter than the magnet array of the movable element. It should be noted that auxiliary information as to whether the position sensor faces the movable element, whether the Hall elements of the stationary element faces the movable element, or the like may be utilized in addition to the inductance of the coils.

Preferably, the length of the magnet array is longer than an arrangement pitch of the stationary elements so that, when a rear end of the magnet array faces a coil at a rear end of a stationary element on a back side, a front end of the magnet array can face a coil at a rear end of a stationary element on a front side. In this manner, it becomes possible to reduce the possibility that the magnet array only faces one stationary element, and increase the possibility that the magnet array faces a pair of left and right stationary elements. In the state where the magnet array faces a plurality of stationary elements, based on information that (i) the magnet array faces equally to both of left and right stationary elements, (ii) the magnet array faces one of the stationary elements in a wide range and faces the other of the stationary elements in a narrow range, etc., the position of the magnet array can be determined more reliably.

Further, preferably, the start-up unit applies direct current to the stationary elements when the power supply is turned on, to roughly position the movable element to any of a plurality of positions, and applies alternating current to the stationary elements after positioning of the movable element, to measure the change of inductance. In this manner, by applying direct current to the coils, the movable element can be positioned roughly to any of a plurality of positions. Further, by applying alternating current to the coils, it is possible to determine at which rough position the movable element is present.

Preferably, the alternating current has a frequency that does not cause movement of the moving body following the alternating current, and the start-up unit measures direct current resistance of each of the coils of the stationary elements at the time of applying the direct current to the stationary elements when the power supply is turned on, determines alternating current impedance of each of the coils upon application of the alternating current, and determines inductance of each of the coils by removing the direct current resistance from the determined alternating current impedance. In this manner, inductance of each of the coils can be determined easily.

Further, preferably, each of the stationary elements has Hall elements on left and right sides, and the start-up unit is configured to detect whether there is any movable element around any of the stationary elements, based on outputs from the Hall elements or outputs from the position sensors, and applies the direct current and alternating current to only the stationary element having any surrounding movable element. In this manner, it is not required to apply direct current or alternating current to the stationary elements that are not needed for position determination.

A method of determining an initial position of a moving body according to a preferred embodiment of the present invention is carried out in a moving body system including the moving body having a magnet array as a movable element of a linear motor, stationary elements of the linear motor provided on a ground, and position sensors each having a measurement range that is shorter than a length of the movable element. Each of the stationary elements includes a plurality of coils.

For determining the initial position of the moving body, the method includes the steps of: arranging the position sensors discretely; arranging the stationary elements between the position sensors to enable determination of a rough position of the movable element based on a change of inductance of a coil of any of the stationary elements resulting from interaction with the magnet array; and determining an initial position of the moving body by start-up unit when a power supply for the moving body system is turned on, based on the rough position of the movable element relative to the stationary element and a signal from the position sensor.

In the specification, the description regarding the moving body system is directly applicable to the method of determining the initial position of the moving body, and conversely, the description regarding the method of determining the initial position of the moving body is directly applicable to the description regarding the moving body system.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
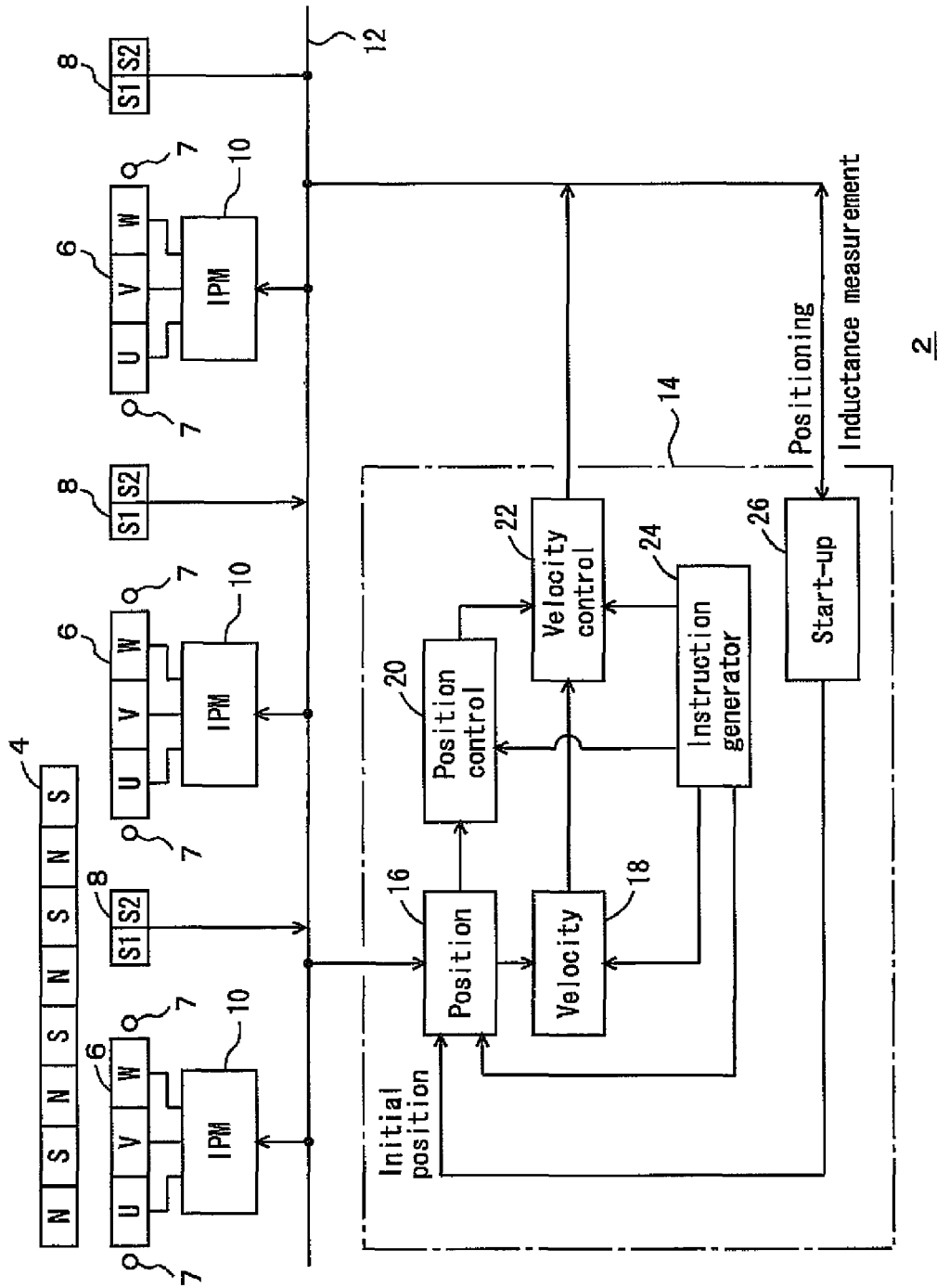
FIG. 1 is a block diagram showing a moving body system according to a preferred embodiment of the present invention.

Hereinafter, preferred embodiments of the present invention will be described. The scope of the present invention shall be determined according to understanding of a person skilled in the art based on the description of the claims in consideration of the description of the specification and techniques known in this technical field.

FIGS. 1 to 7 show a moving body system 2 according to a preferred embodiment of the present invention and various modifications thereof. In the drawings, a reference numeral 4 denotes a movable element of a linear motor provided on a moving body (not shown). For example, the moving body may be a stacker crane, an overhead traveling vehicle, a rail vehicle traveling on the ground, a conveyor, a movable head of machine equipment, etc. The number of magnetic poles of the movable element 4, i.e., the number of magnetic poles oriented to a stationary element is, e.g., 6 to 11. Reference numerals 6 denote stationary elements of the linear motor. The stationary elements are provided on the ground along a moving route of the moving body. For example, the stationary element 6 preferably is a three-phase synchronous motor having a U-phase, a V-phase, and a W-phase. For example, magnetic sensors such as a pair of Hall elements 7 are provided on front and back sides of the stationary element 6.

Reference numerals 8 denote position sensors. For example, the position sensor 8 includes a pair of coils S1, S2 for position detection, and a control circuit. The position sensor 8 detects magnets of the movable element 4, and has a measurement range that is shorter than the length of the magnet array. The length of the movable element 4 herein means the length of the magnet array. The position sensor 8 is not capable of detecting a position of the magnet that is being detected, among the plurality of magnets of the movable element 4. However, once a rough position of the movable element 4 is identified, for example, once the most recent position of the movable element 4 is identified, it is possible to determine which magnet is being detected, and output an absolute position of the movable element 4. The absolute position herein means a position based on a suitable point of origin on the system. The position sensor is a linear sensor arranged to output a signal that is linear relative to the position of the movable element 4.

Reference numerals 10 denote IPMs (intelligent power module) arranged and programmed to control the stationary elements 6. The IPM 10 is an example of a power supply circuit for the stationary element 6. A reference numeral 12 denotes a LAN. The stationary elements 6, the position sensors 8, and a ground controller 14 are connected to the LAN 12. One controller 14 may be provided for the entire moving body system 2. Alternatively, the system 2 may be divided into a plurality of zones, and the controller 14 may be provided for each of the zones. The controller 14 includes a position memory 16 arranged to store data of a position signal from the position sensor 8, and a velocity calculator 18 arranged to calculate velocity of the moving body by temporal differentiation. An instruction generator 24 generates a position instruction or a velocity instruction at predetermined time intervals, and a position controller 20 generates an output in correspondence with a difference between the position of the moving body and a position indicated by the position instruction. A velocity controller 22 outputs a control instruction to the IPM 10 in correspondence with a difference between the velocity of the moving body and velocity indicated by the velocity instruction, and the output from the position controller 20. The IPM 10 applies electrical current having a frequency in correspondence with the signal from the velocity controller 22, to the three-phase synchronous motor of the stationary element to move the movable element 4.

The ground controller 14 includes a start-up unit 26. At the time of turning on a power supply for the moving body system 2 for the first time, or at the time of turning on the power supply for the system after restoration from a power failure or the like, an initial position of the moving body, i.e., an initial position of the movable element is measured.

The measurement includes two steps of:

roughly positioning the movable element 4 to any of a plurality of positions, relative to the stationary element 6; and after positioning of the movable element 4, determining the position of the movable element 4 among the plurality of positions, based on a change of inductance resulting from magnetic interaction between the coil of the stationary element 6 and the magnet of the movable element 4, to determine a rough position of the movable element 4. When or after the position of the movable element is roughly determined, by the signal from the position sensor 8, the initial position of the movable element 4 is determined.

Further, at the time of positioning, and measurement of inductance, selection of the stationary element 6 is made, e.g., by:

operating the stationary elements 6 indiscriminately; and selecting the stationary element 6 facing the movable element 4 by the Hall elements 7; or applying short high frequency electrical current to the stationary element 6 to determine whether the stationary element 6 faces the movable element 4. Additionally, for example, the start-up unit 26 stores resistance of each coil of the stationary element 6. The three coils of each stationary element 6 have substantially the same resistance. Further, the start-up unit 26 converts impedance of the coil into inductance.

Figure 2:
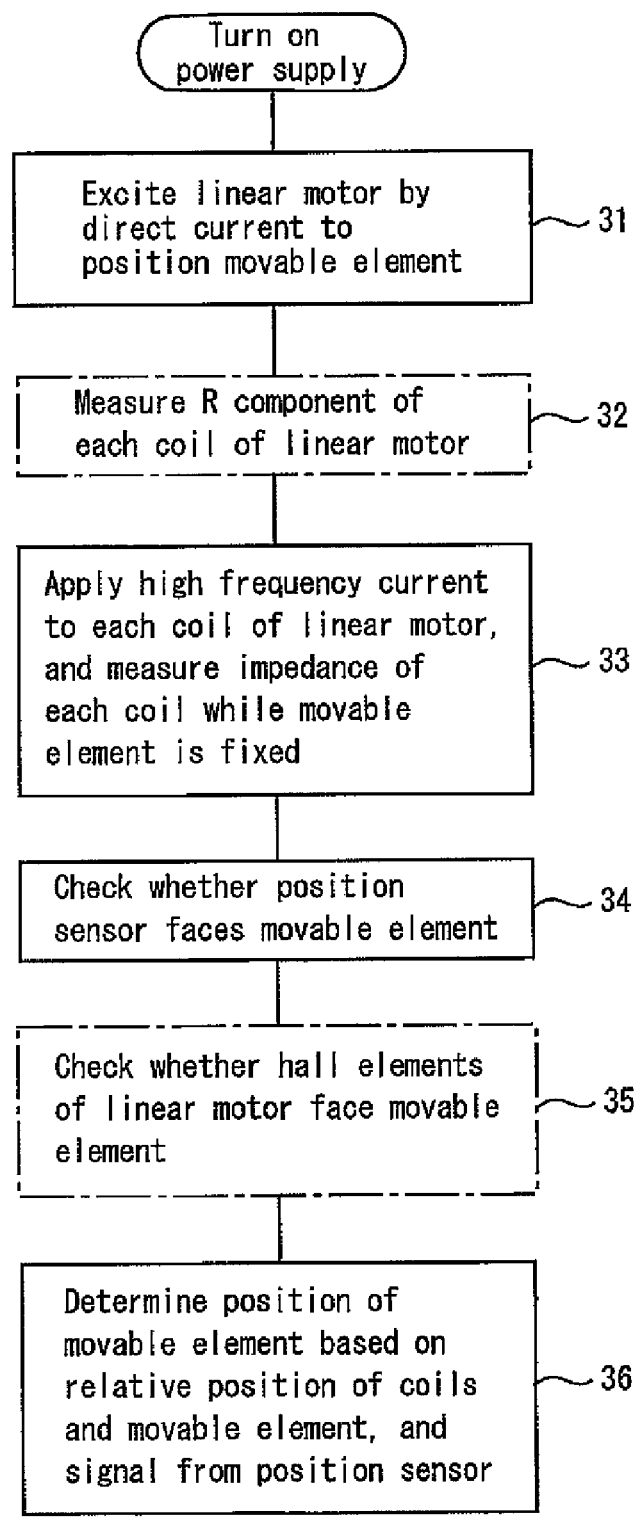
FIG. 2 is a flow chart showing processing at the time of start-up operation of the moving body system according to a preferred embodiment of the present invention.

FIG. 2 shows an algorithm of positioning the moving body when the power supply is turned on in the present preferred embodiment. Among steps 31 to 36, steps 32 and 35 may be omitted. In the initial step 31, the stationary elements of the linear motor are excited by direct current to roughly position the movable element to any of a plurality of rough positions. That is, when direct current is applied to the coils of the stationary elements, by magnetic suction or reaction of the magnets of the movable element, the movable element is positioned roughly to any of several positions where the movable element can be positioned roughly. At this time, since direct current is applied, the impedance of each coil is not influenced by the magnet array. Therefore, in addition to applying direct current, the direct current resistance of each coil may be measured based on the voltage and electrical current value of the direct current power supply, as shown in step 32. It should be noted that step 32 may be omitted, and the resistance of each coil may be stored by the start-up unit 26.

After positioning, high frequency electrical current is applied to the coils of the stationary elements of the linear motor. The frequency at this time is high, specifically, 1 KHz or more, or 10 Kz or more, and thus, the moving body does not move following the high frequency. Position measurement of the movable element can be performed in a very small period of time. Therefore, alternating current having a low frequency may be applied to the stationary elements 6, and movement of the movable element by a minute distance may be acceptable.

Alternating current impedance may be determined from an electrical current value when pulses of direct voltage are applied to the stationary elements. When alternating current or the similar current is applied to each coil of the stationary elements, inductance of the coil is changed based on the position of the movable element facing the magnet array. Since the direct current resistance value of the coil has already been measured or stored, the impedance can be converted into inductance. In this manner, the inductance of the coil is measured, and the facing relationship between the movable element 4 and the magnet array is determined (step 33).

Depending on the position of the movable element, the rough position relative to the movable element cannot be determined only from the inductance of each coil of the stationary element. Therefore, auxiliary information as to whether the position sensor faces the movable element (step 34), whether the Hall elements of the stationary element or the like face the movable element (step 35), or the like are utilized additionally. Based on the inductance of each coil of the stationary element, and the auxiliary information obtained from the position sensor or the Hall elements, the rough position of the movable element relative to the stationary element is determined. Since the measurement range of the position sensor is shorter than the total length of the movable element, the absolute position of the movable element cannot be detected. Further, once the rough position of the movable element is identified, the absolute position can be determined by the position sensor (step 36).

Figure 3:
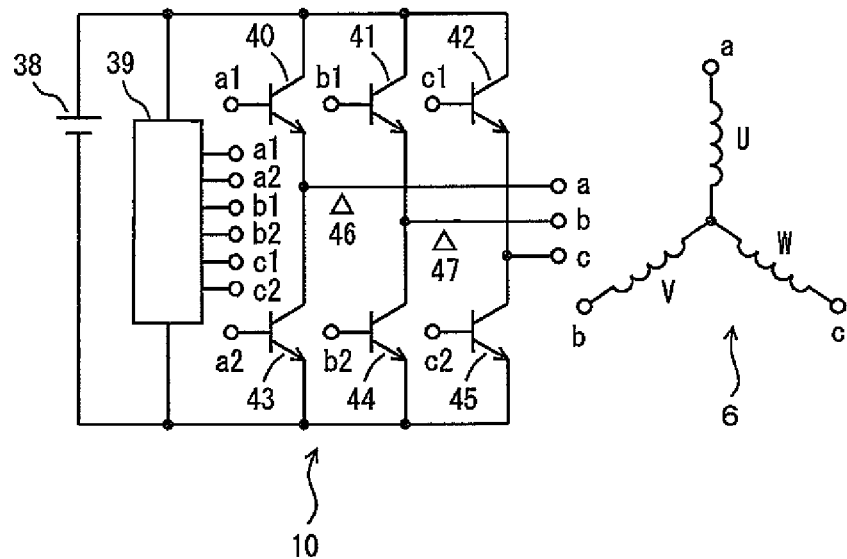
FIG. 3 is a block diagram showing a three-phase alternating current motor and a control module according to a preferred embodiment of the present invention.

FIG. 3 shows structure of the three-phase alternating current synchronous motor of the stationary element 6 and IPM 10. The stationary element 6 preferably includes three coils in the U-phase, the V-phase, and the W-phase, and three contacts a, b, and c. The IPM 10 has a power supply 38 and a control unit 39. The control unit 39 activates the stationary element 6, e.g., by turning on and off six power elements 40 to 45 by signals a1 to c2. By the signal a1 to c2, direct current can be applied to the stationary element 6 in an arbitrary orientation, and alternating current of an arbitrary frequency can be applied to the stationary element. Further, the control unit 39 monitors the electrical current flowing through the contacts a, b using the electrical current sensors 46, 47 such as Hall elements. The electrical current value of the electrical current flowing through the contact c is determined by the sum of the electrical current values of electrical current flowing through the contacts a, b. Further, the determined electrical value is transmitted to a controller for calculation of the impedance.

Figure 4:
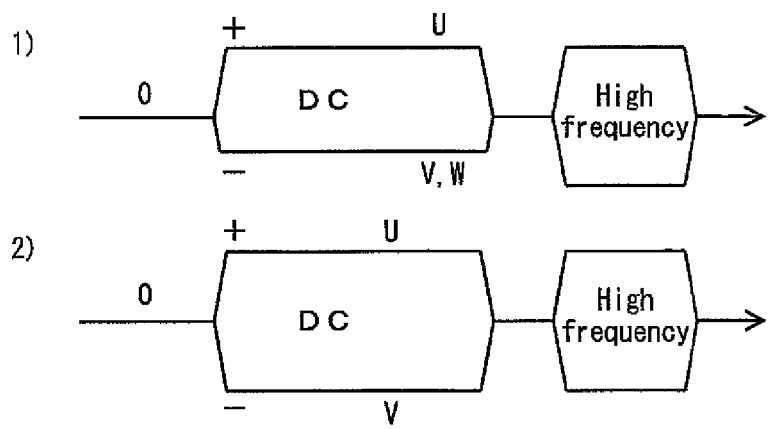
FIG. 4 is a waveform diagram schematically showing direct current and high frequency current applied at the time of start-up operation of the moving body system according to a preferred embodiment of the present invention, where a waveform (1) shows an example where electrical current applied to the U-phase is distributed uniformly to the V-phase and the W-phase; and a waveform (2) shows an example where electrical current applied to the U-phase is supplied to the V-phase.

FIG. 4 shows a waveform diagram of electrical current applied to the coils of the stationary element when the power supply is turned on. The first waveform shows a direct current waveform used for temporarily positioning the stationary element. The next waveform is a high frequency waveform for measuring the inductance of each coil without moving the movable element. In the waveform 1) of FIG. 4, a positive (+) potential is applied to the U-phase of the stationary element, and a minus (−) potential is applied to each of the V-phase and the W-phase of the stationary element. One half of the direct current applied to the U-phase is supplied to each of the V-phase and the W-phase. In the waveform 2) of FIG. 4, for example, the W-phase is turned off, and direct current applied to the U-phase is collected from the V-phase. The pattern of direct current applied to the stationary element at the time of positioning can be determined arbitrarily.

Figure 5:
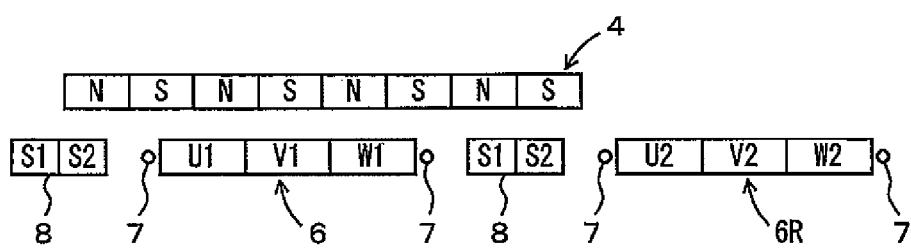
FIG. 5 is a view showing a layout of a movable element on a moving body, and stationary elements and position sensors on the ground according to a preferred embodiment of the present invention.
Figure 6:
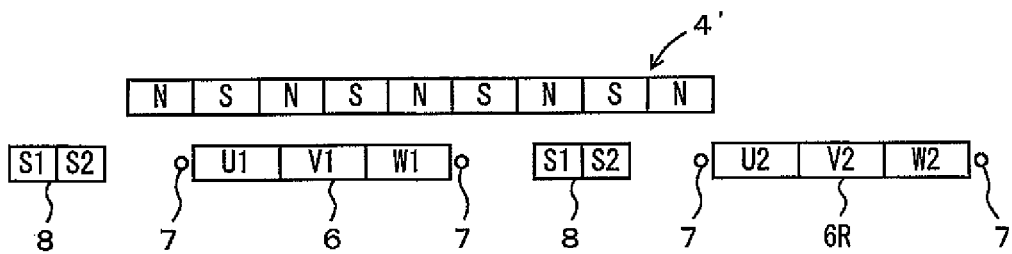
FIG. 6 is a view showing a layout of a movable element on a moving body, and stationary elements and position sensors on the ground according to a modified preferred embodiment of the present invention.

FIG. 5 shows an example of positional relationship between the movable element 4 and the stationary elements 6. A reference numeral 6R denotes a stationary element provided on the right side of the stationary element 6 currently being focused. Reference numerals U1, V1, W1 denote the coils of the stationary element 6 that is currently being focused. Further, reference numerals U2, V2, W2 denote the coils of the stationary element 6R on the right side. The stationary elements 6 and the position sensors 8 are arranged alternately at a certain pitch, e.g., in straight segments. The arrangement pitch of the stationary elements 6 and the arrangement pitch of the position sensors 8 are the same. These arrangement pitches are shorter than the length of the magnet array of the movable element 4. In this configuration, when the coil U1 at the left end of the stationary element 6 faces the magnet at the left end of the movable element 4, the coil U2 at the left end of the right stationary element 6R at least partially faces the magnet at the right end of the movable element 4.

Normally, in the movable element 4, the number of N poles and the number of S poles are the same. Alternatively, as in the case of movable elements 4' shown in FIG. 6, the number of N poles may be different from the number of S poles. Also in this case, when the coil U1 of the stationary element 6 faces the magnet at the left end of the movable element 4', the coil U2 of the stationary element 6R faces the magnet at the right end of the movable element 4'. The number of poles herein means the number of poles oriented toward the stationary element 6.

Figure 7:
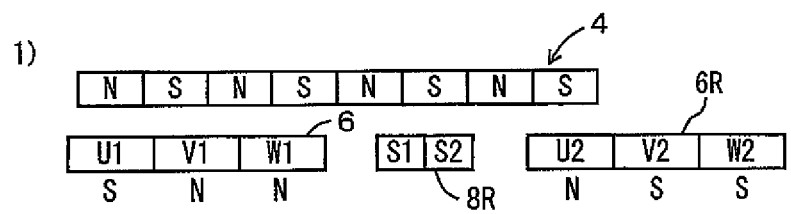
FIG. 7 is a view showing layouts for position measurement of the movable element on the moving body in a preferred embodiment of the present invention, where a layout 1) shows an example of positioning; and layouts 2) to 5) show a position measurement method for each position of the movable element at the time of positioning.
Figure 7:
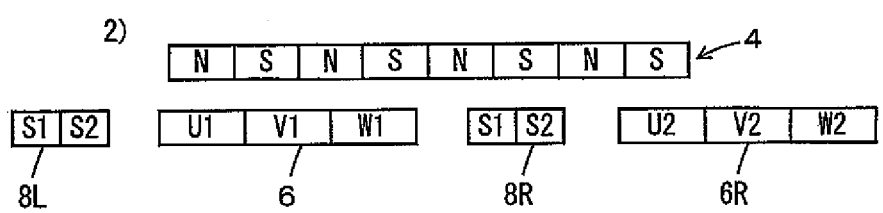
Figure 7:
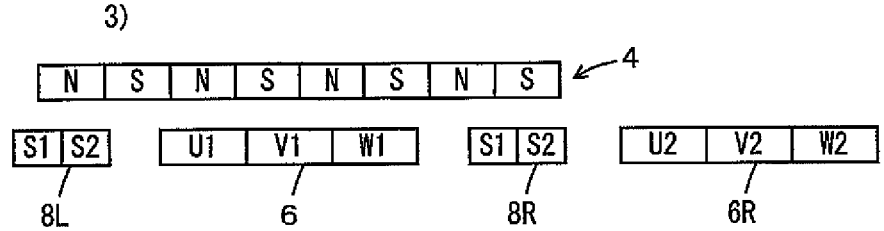
Figure 7:
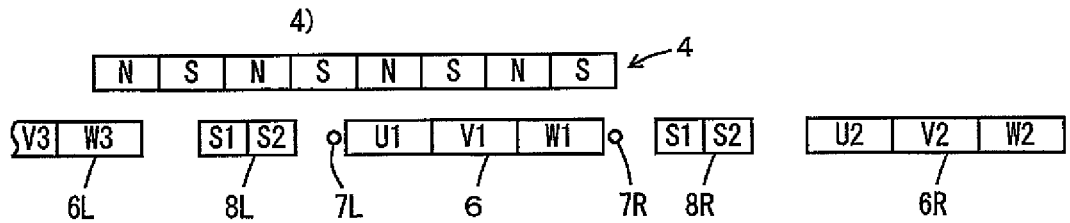
Figure 7:
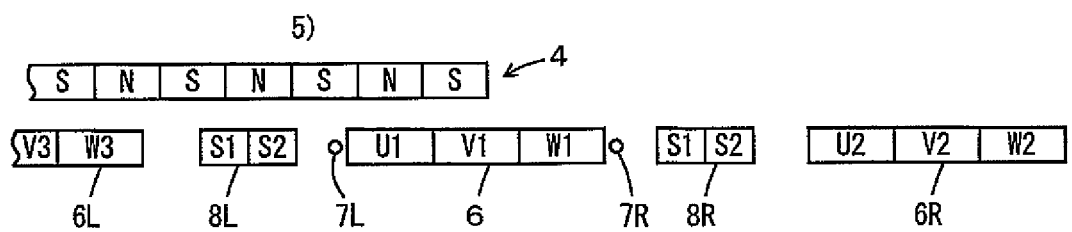

FIG. 7 shows positioning of the movable element 4. The layout 1) of FIG. 7 shows a case where the movable element 4 is positioned roughly by applying direct current to the stationary elements 6, 6R to excite the coils as illustrated. By applying direct current to the stationary elements 6, the movable element 4 can be positioned roughly to any of a plurality of positions. For example, the movable elements 4 can be positioned to any of four positions shown in the layouts 2) to 5). For example, the number of possible rough positions of the movable elements is a number of pairs of N and S poles of the movable elements (in the case where the number of the magnets is an even number), or (the number of magnets of the movable element 4−1)×½ (in the case where the number of the magnets is an odd number). Further, by utilizing positioning by direct current, resistance values of the coils are measured.

Then, it is determined whether the movable element 4 is positioned at any of these rough positions. In the case of the layout 2) of FIG. 7, both of the coils U1, U2 face the movable element 4. There is no such a position in the other layouts. However, the coils V2, W2 does not face the movable element 4. In this case, the rough position can be determined only by the signals from the stationary elements 6, 6R, and the fine position can be determined by a signal from the position sensor 8R.

In the layout 3) of FIG. 7, the rough position of the movable element 4 cannot be determined only by the signals from the stationary element 6. However, both of the left and right position sensors 8L, 8R of the stationary element 6 detect the movable element 4, and there is no such rough position in the other layouts. Therefore, the position can be determined. Also in this case, by any of the signals from the position sensors 8L, 8R, the fine position of the movable element 4 can be determined. Also in the following cases, the fine position of the movable element 4 can be determined in the same manner.

Also in the layout 4), the rough position of the movable element 4 cannot be determined only by the signal from the stationary element 6. However, since the left position sensor 8L faces the movable element 4, and the right position sensor 8R does not face the movable element 4, the rough position can be determined. The rough position can be determined even if the position sensors 8L, 8R are not used, because only the coil W3 of the left stationary element 6L faces the movable element 4. Further, the fact that both of left and right the Hall elements 7L, 7R of the stationary element 6 face the movable element 4 can be used as auxiliary information for determining the rough position.

In the layout 5) of FIG. 7, inductances of the coils U1, V1 of the stationary element 6 are different from the inductance of the coil W1 of the stationary element 6. The position sensor 8L faces the movable element 4, and the position sensor 8R does not face the movable element 4. Further, in the left stationary element 6L, both of the coils V3, W3 face the movable element 4. Further, the left Hall element 7L of the stationary element 6 faces the movable element 4, and the right Hall element 7R does not face the movable element 4. Therefore, the state of the layout 5) can be identified separately from the states in the layouts 2) to 4). In this manner, the rough position of the movable element 4 relative to the stationary element 6 can be determined, and the detailed position can be determined by the position sensor 8.

In general, the number of movable elements 4 is smaller than the number of stationary elements 6. Therefore, it is not necessary to apply direct current and high frequency current to all of the stationary elements 6. In this regard, for example, the direct current and high frequency current should be applied to the stationary element detecting the movable element 4 by the Hall elements 7 and the left and right stationary elements on both sides. The direct current and high frequency current should be applied also in the case where the presence of the nearby movable element 4 is detected by the position sensors 8 instead of the Hall elements 7. Further, in the case of applying high frequency current, the high frequency current is preferably applied as three-phase alternating current to the stationary element 6 to measure inductance of each of three coils (U-phase, V-phase, and W-phase). The data obtained by measurement can be utilized for distinguishing the layouts of 4) and 5) in FIG. 7.

In the present preferred embodiment, the position sensor 8 having a measurement range shorter than the length of the movable element 4 and the stationary elements 6 are preferably used for making it possible to determine the absolute position of the movable element when the power supply is turned on. Further, by adopting the arrangement pitch of the stationary element 6 to be shorter than the length of the magnet array of the movable element 4, and providing the magnets on both sides of the movable element 4 to face the coil (U-phase) at the rear end of the left stationary element 6 and the coil (U-phase) at the rear end of the right stationary element 6, or to face the coil (W-phase) at the front end of the left stationary element 6 and the coil (W-phase) at the front end of the right stationary element 6, the movable element can be positioned roughly from an arbitrary initial position. Further, when the power supply is turned on, by applying direct current to the stationary elements 6, the movable element 4 is positioned roughly to any of a plurality of positions. Then, by applying alternating current to the stationary elements 6 to measure the inductances of each coil, it becomes possible to determine at which one of the plurality of positions the movable element 4 is present. Further, once the rough position is identified, it becomes possible to determine the absolute position of the movable element 4 using the position sensor 8.

In the present preferred embodiment, inductance of each coil is determined by measuring impedance of each coil, and removing the resistance component. Alternatively, the inductance may be determined by changing the frequency of alternating current applied to the coil. Further, the inductance of each of the coils of the U-phase, the V-phase, and the W-phase may be measured. Alternatively, the inductance of only the coil of the U-phase, or only the inductances of coils of the U-phase and the W-phase, at both ends of the stationary element 6 may be measured.

In the present preferred embodiment, by positioning the movable element to any of positions by direct current, the position of the movable element is determined. However, positioning using direct current may be omitted. For this purpose, initially, high frequency current is applied, and any of the positions of the layouts 2) to 5) of FIG. 7 is identified for position determination. The determined position may not be accurate. Therefore, for example, while moving the moving body, for example, by about the length of the stationary element 6, inductance of each coil is measured. If the position is correct, the inductance changes in a predetermined pattern. If the position is not correct, the position is corrected based on the pattern in the change of the inductance, or processing in FIG. 7 is carried out again.

While preferred embodiments of the present invention have been described above, it is to be understood that variations and modifications will be apparent to those skilled in the art without departing the scope and spirit of the present invention. The scope of the present invention, therefore, is to be determined solely by the following claims.

DESCRIPTION OF THE NUMERALS

2: moving body system
4: movable element
6: stationary element
7: Hall element
8: position sensor
10: IPM
12: LAN
14: ground controller
16: position memory
18: velocity calculator
20: position controller
22: velocity controller
24: instruction generator
26: start-up unit
31 to 36: step
38: power supply
39: control unit
40 to 45: power element
46, 47: current sensor

What is claimed is:

1. A moving body system comprising:
a moving body including a magnet array defining a movable element of a linear motor;
stationary elements of the linear motor being provided on a ground and each including a plurality of coils; and
position sensors each having a measurement range shorter than a length of the movable element; wherein
the position sensors are arranged discretely;
the stationary elements are arranged between the position sensors to enable the position sensors to determine a rough position of the movable element based on a change of inductance of at least a coil of the stationary elements resulting from interaction with the magnet array;
the moving body system further includes a start-up unit arranged to determine an initial position of the moving body when a power supply for the moving body system is turned on, based on the rough position of the movable element relative to at least one of the stationary elements and a signal from at least one of the position sensors.

2. The moving body system according to claim 1, wherein a length of the magnet array is longer than an arrangement pitch of the stationary elements so that, when a rear end of the magnet array faces a coil at a rear end of one of the stationary elements on a back side, a front end of the magnet array faces a coil at a rear end of the one of the stationary elements on a front side.

3. The moving body system according to claim 1, wherein the start-up unit is arranged to apply direct current to the stationary elements when the power supply is turned on, to roughly position the movable element to any of a plurality of positions, and to apply alternating current to the stationary elements after positioning of the movable element to measure the change of inductance.

4. The moving body system according to claim 3, wherein the start-up unit is arranged to apply the alternating current so as to have a frequency that does not cause movement of the moving body following the alternating current, and to measure direct current resistance of each of the coils of the stationary elements at the time of applying the direct current to the stationary elements when the power supply is turned on, determining alternating current impedance of each of the coils upon application of the alternating current, and determining inductance of each of the coils by removing the direct current resistance from the determined alternating current impedance.

5. The moving body system according to claim 3, wherein each of the stationary elements includes Hall elements on left and right sides, and the start-up unit is arranged to detect whether there is any movable element around any of the stationary elements, based on outputs from the Hall elements or outputs from the position sensors, and to apply the direct current and alternating current to only the stationary element having any surrounding movable element.

6. A method of determining an initial position of a moving body in a moving body system comprising the moving body including a magnet array defining a movable element of a linear motor, stationary elements of the linear motor provided on a ground, and position sensors each having a measurement range that is shorter than a length of the movable element, the stationary elements each including a plurality of coils, the method comprising the steps of:
arranging the position sensors discretely;
arranging the stationary elements between the position sensors to enable determination of a rough position of the movable element based on a change of inductance of a coil of any of the stationary elements resulting from interaction with the magnet array; and
determining an initial position of the moving body by a start-up unit when a power supply for the moving body system is turned on, based on the rough position of the movable element relative to the stationary element and a signal from the position sensor.

* * * * *